United States Patent [19]

Thorpe

[11] 4,176,704
[45] Dec. 4, 1979

[54] EMERGENCY TRACTION DEVICE
[76] Inventor: Walter H. Thorpe, 9403 Somerset, Detroit, Mich. 48224
[21] Appl. No.: 761,593
[22] Filed: Jan. 24, 1977
[51] Int. Cl.² .................. B60C 27/00; B60C 27/02
[52] U.S. Cl. ....................... 152/225 C; 152/223; 152/221
[58] Field of Search ....... 152/225 C, 225 R, 217–218, 152/221, 223, 213 A, 226–230

[56] References Cited
U.S. PATENT DOCUMENTS

| | | | |
|---|---|---|---|
| 1,250,908 | 12/1917 | Lowrey, Jr. | 152/223 |
| 2,076,894 | 4/1937 | Johnson | 152/225 C |
| 2,532,380 | 12/1950 | Tschohl et al. | 152/225 C |
| 2,596,248 | 5/1952 | Kennedy | 152/225 R |
| 2,597,458 | 5/1952 | Cummins | 152/225 R |
| 2,612,202 | 9/1952 | Bumbaugh | 152/225 R |
| 3,106,949 | 10/1963 | Timmons | 152/218 |

FOREIGN PATENT DOCUMENTS 962177 2/1975 Canada .................... 152/221

Primary Examiner—Stephen G. Kunin
Assistant Examiner—Lawrence E. Williams
Attorney, Agent, or Firm—Dolgorukov & Dolgorukov

[57] ABSTRACT

Provided is a novel emergency traction device adapted for use on all vehicles which use circular rubber tires or the like for movement. The traction device disclosed, by virtue of its design, takes advantage of inherent physical forces to maintain the device on the tire during forward motion and rotation of the tire, rather than depending on conventional securing devices. By doing so, the present device can be mounted entirely from one side of the tire in a snap-on motion without having to remove the tire from the vehicle, or elevating the vehicle, as was required by past traction devices.

18 Claims, 9 Drawing Figures

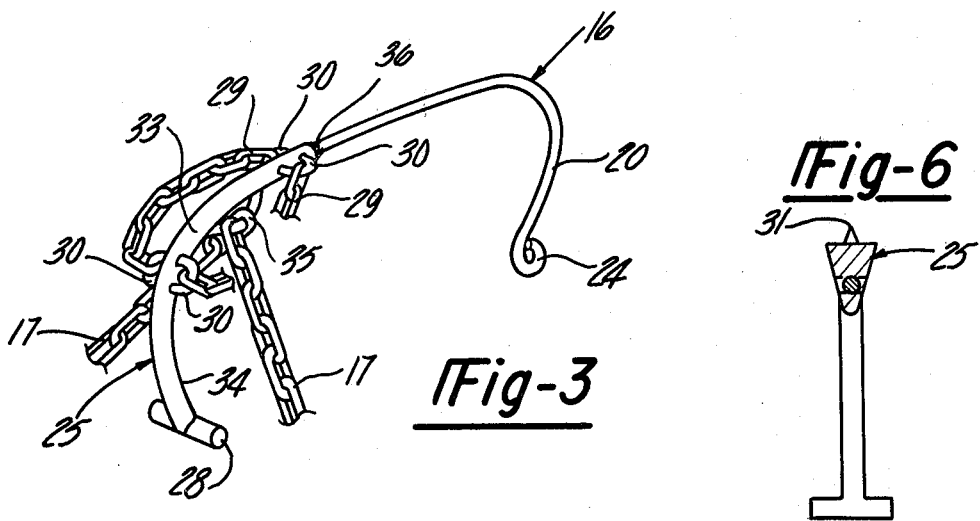
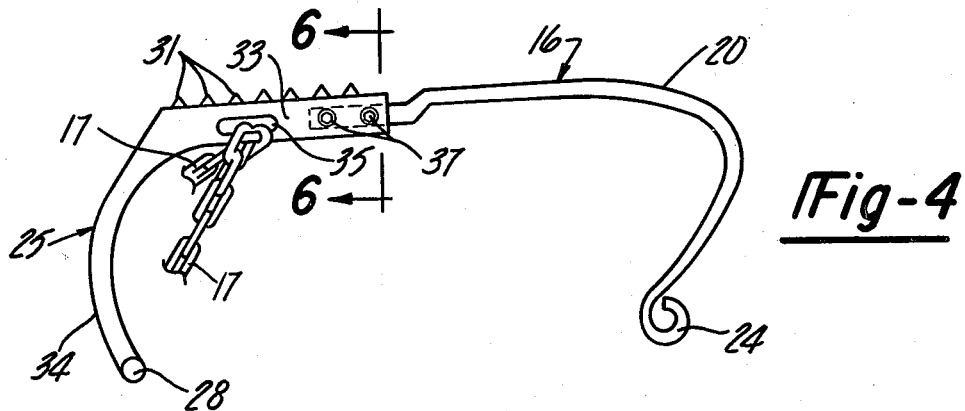

EMERGENCY TRACTION DEVICE

The present invention relates to devices intended to provide additional traction to the ordinary tire for winter driving in snow and the like, and more particularly to a device which is intended to be used on an emergency or temporary basis when particularly difficult driving conditions occur.

The problem of providing additional traction in snow and under other conditions encountered under winter driving conditions has been one which has been present since the advent of the automobile, and many, many, devices have been developed in an attempt to solve this problem. A few of such devices, for example, are shown in the catalog of the J. C. Whitney and Company automotive supply house on page 39 of their catalog No. 342. Many devices are shown therein, such as conventional tire chains, modified conventional chains and chains made out of new plastic materials.

From a review of such devices, and others on the market, the development of this art can be ascertained as beginning with what are known as conventional tire chains consisting of a plurality of links mounted transversely to the tire tread and being held together by connecting chains on either side of the tire. While this device, until the time of the present invention, provided the maximum traction possible, it was only practical to use on a continuous basis due to the length of time and difficulty encountered in mounting it on a tire, and thus as a practical matter was only usable in geographic locations where snow was on the road continuously all through the winter months. As soon as the snow would melt and the chains would come in contact with the dry pavement, they wore rapidly and were extremely noisy to use.

Thus, it can be seen that ordinary tire chains provided no solution to the problem of getting extra traction on a temporary basis. Devices such as emergency snow cleats which wrapped around the tire in a transverse direction and were mounted through slots in the tire rim seem to me to be the next step in the development of this art, but because such cleats must go through said slots in the tire rim, they could not be of very large dimension, and effectively only provided a moderate additional gripping area which proved little better than no additional device at all. In addition, the use of such devices required the removal of the wheel covers from the tires on which they were to be mounted, and thus were inconvenient to use.

The next step seems to have been to go back to a conventional tire chain type construction made out of synthetic plastic and provide a device which again would be left on the tire at all times, but would not have the objectionable noise problem that conventional tire chains had. In addition, in a manner not immediately apparent to Applicant, these chains are said to be easy to mount and take on and off easily. However, they still suffer from the problem, even with the modification to the teeth, of not providing a very large gripping area and thus are still unsatisfactory for a real solution to the problem of providing a great deal of additional traction on an emergency basis.

I have therefore, by using the physical forces which inherently act on any tire chain, overcome these problems and provided an emergency traction device mountable from one side of the tire only and having very large gripping surfaces to provide superior traction.

Accordingly, it is one of the objects of the present invention to provide an emergency traction device easily mountable on any type of tire which provides superior traction.

A further object of the present invention is to provide an emergency traction device which can be mounted without removing the tire on which it is desired to mount the device from the vehicle.

A further object of the present invention is to provide a device of the foregoing nature which does not require elevation of the vehicle on whose tires the device is to be mounted.

A still further object of the present invention is to provide a device of the foregoing nature which utilizes physical forces in its design so as to provide for the traction device to grip the tire of the vehicle tighter as the vehicle speed increases.

A still further object of the present invention is to provide an emergency traction device which can be easily mounted and dismounted from the vehicle tire as the need arises.

Another object of the present invention is to provide an emergency traction device of the foregoing nature which is relatively simple and inexpensive to manufacture.

Further objects and advantages of this invention will be apparent from the following description and appended claims, reference being made to the accompanying drawings forming a part of the specification, wherein like reference characters designate corresponding parts in the several views.

FIG. 3 is a perspective view of the construction shown in FIG. 2 showing the inwardly and outwardly extending portions of one clamp bar assembly and the gripper chain attachments thereto.

FIG. 4 is a view similar to that of FIG. 2 showing a modification of my invention.

FIG. 5 is a plan view of the clamp bar assembly shown in FIG. 4.

FIG. 6 is a sectional view of a clamp bar assembly taken in the direction of the arrows on the Section line 6—6 of FIG. 4.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that phraseology and terminology employed herein is for the purpose of description and not of limitation.

Figure 1:
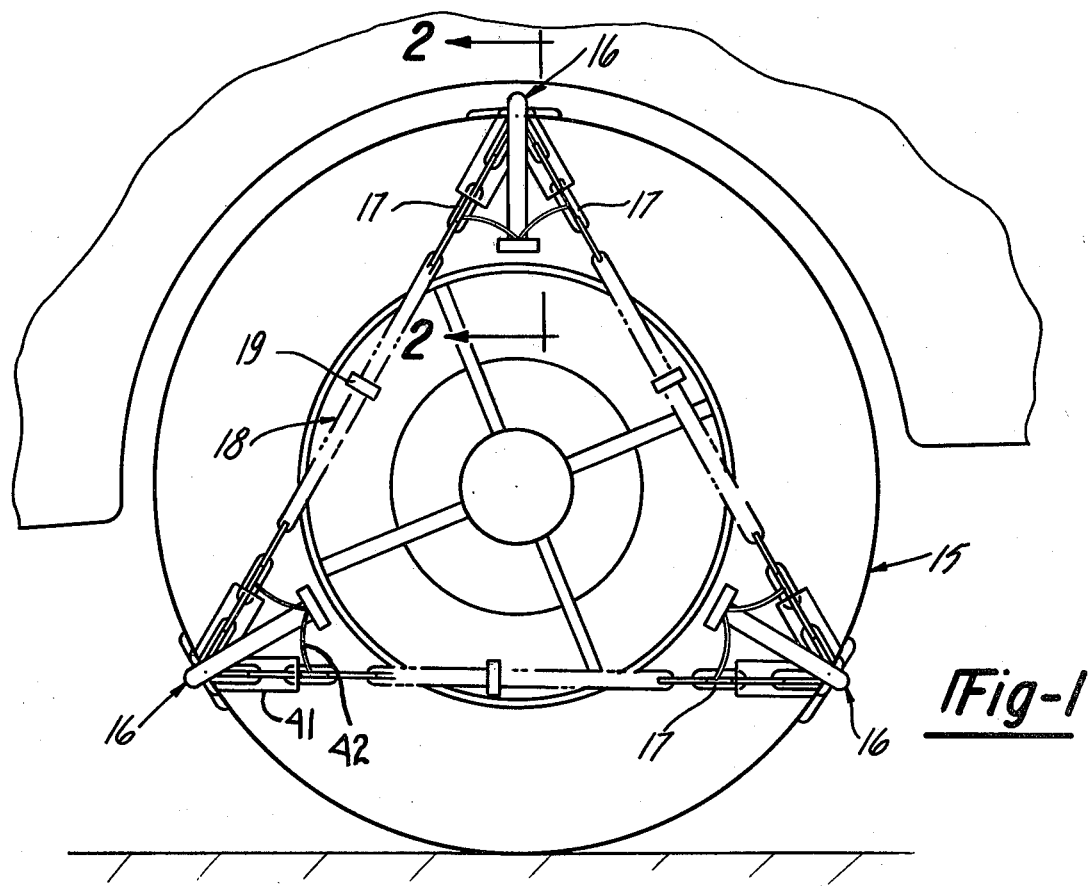
FIG. 1 is an elevational view of a construction embodying the present invention installed on a vehicle tire.

Referring to FIG. 1, my emergency traction device is shown installed on a vehicle tire generally designated by the numeral 15 and includes at least three (3) clamp bar assemblies generally designated by the numeral 16 being connected together by a plurality of connecting means such as the chains 17, which may have an adjustable length control mechanism 18 included therein. The adjustment of the connecting chain 17 length can be accomplished by the turning of the lock nut 19 on the adjustable length control mechanism 18. In this manner, variations between different size tires or between manufacturers of identical tire sizes, or tire wear can be compensated for.

Figure 2:
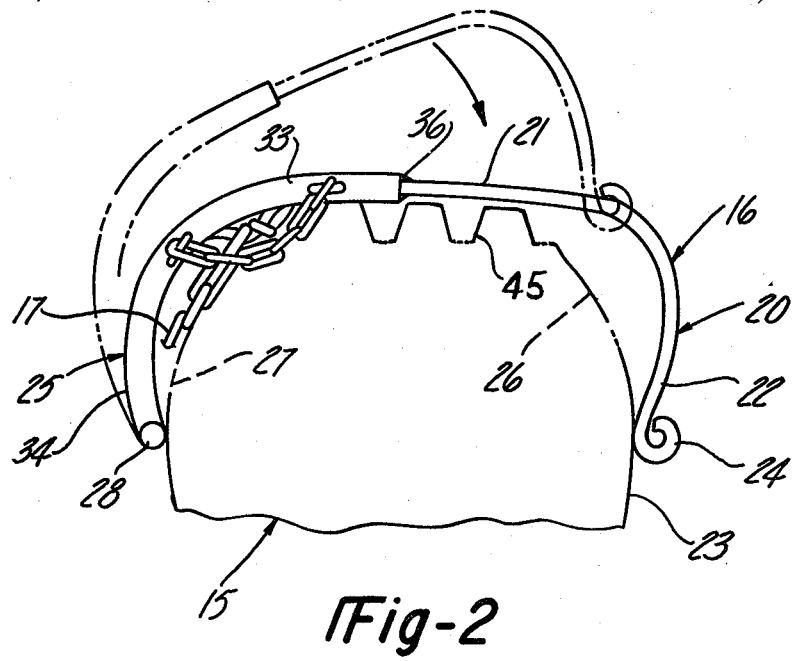
FIG. 2 is a sectional view taken in the direction of the arrows on the Section line 2—2 of FIG. 1 showing in enlarged detail the installation of the construction shown.

The ease of installation of my device can be seen by referring to FIG. 2, where a clamp bar assembly 16, is shown being lapped over the vehicle's tire 15, with the inwardly extending spring portion 20 of the clamp bar assembly 16, being placed against the inside 26 of the vehicle's tire 15.

Each of the clamp bar assemblies, generally designated by the numeral 16, consists of an inwardly extending portion generally designated by the numeral 20, having a straight portion 21 generally coextensive with one-half the tire thread, 45 and a curvilinear portion 22. Such inwardly extending portion is 20 is made of a spring like material, such as spring, steel, wire, or the like. In referring to an inwardly extending portion it is to be understood that I mean extending toward the inside of the tire, or toward the vehicle, when my construction is mounted on a vehicle tire. The extremity 24 of the inwardly extending portion 20 is curved back away from the tire in some manner so as to aid sliding onto and off of the tire, and also, so as not to present a sharp point which may puncture the tire. The extremity 24 can be of any suitable shape to accomplish these purposes and in reality its exact shape is most likely to depend on exactly which manufacturing process is used to manufacture the clamp bar assemblies used in my construction, and more particularly, what process and what type of material is used to manufacture the inwardly extending portion 20.

The straight portion 21 which generally begins about midway across the tire's tread merges into a curvilinear portion 22 and extends passed the inside of the tread to the extremity 24 which should be located more than midway on the curvature of the inner side wall of the tire 26 between the thread and the rim to to provide that flexing of the side wall does not interfere with the gripping action of the portion 24. The inwardly extending portion is adjacent to an outwardly extending portion of the clamp bar assembly 16 generally designated by the numeral 25 and also having a straight portion 33 and a curvilinear portion 34. As before, the outwardly extending portion 25 of the clamp bar assembly 16 will extend from about the middle of the tire tread, but this time will extend coextensive with the tire thread 45 away from the vehicle and merge into a curvilinear portion 34, and continue around the outer side wall 27 of the tire and contact the curvature of the side wall 27 of the tire more than midway between the thread and the rim. As before, the extremity 28 of the outwardly extending portion 25 of the clamp bar assembly 16 is finished in a manner so as facilitate mounting of the clamp bar assembly, and also to not puncture the tire. In this particular case, since the outwardly extending portion of the clamp bar assembly 16 is, for purpose of illustration, shown to be forged, the extremity 28 takes the form of a bar about an inch long and of circular cross-section integrally formed on the outwardly extending portion transversely to the plane of the clamp bar assembly 16.

Since, for ease of mounting my device to the vehicle tire and for purposes to be explained later, it is also desirable to have the inwardly extending portion 20 be of a spring like material to exert a force perpendicular to the side walls of the tire, such portion is normally made thinner than the outwardly extending portion 25 of the clamp bar assembly 16. Since this portion is shown to be thinner, it by itself does not give much traction and for this reason, to insure maximum traction, the outwardly extending portion 25 of the clamp bar assembly 16 is made of a greater diameter to provide the real snow gripping action of my device. Also its shape may extend further from the side wall 27 of the tire than the inwardly extending portion 20 to provide a real bite in the snow. It should be understood, however, that this is only the preferred case, and that actual design parameters may prohibit making this portion on an enlarged scale.

To continue, for the purpose of illustration, if even additional traction over that which is provided by the simple outwardly extending portion being made of an enlarged diameter is desired, several modifications may be made.

Referring to FIG. 3, for example, suitable gripper chains 29 may be mounted adjacent the straight portion 33 of the outwardly extending portion 25 of the clamp bar assembly 16 by a way of suitable attachment means 30. Such chains, because they are loosely mounted, will tend to be further wedged into the snow by the portion 25, providing additional traction.

Another modification (see FIG. 4) involves the making of the straight portion 33 of the outwardly extending portion 25 with integral gripping teeth 31.

It is to be understood that many modifications as to the shape of the inner and outer portions of the clamp bar assembly 16 can be made, and the construction still will be within the scope of the claims. All that is absolutely necessary is that somewhere on each clamp bar assembly 16, for reasons to be explained below, there be a pivot point 35 to which the connecting means are attached, and a positive moment about said pivot point 35 is produced by the centrifugal force Fm as the tire rotates, as shown, for example, in FIGS. 8 and 9. Also, depending on economies of manufacture, it is very possible that the inwardly and outwardly extending portions of the clamp bar assembly will in reality be of an integral one-piece construction, or in the alternative, they may be welded together as shown in FIGS. 2 and 3 by the numeral 36, or they may be of such a construction as shown in FIG. 4 where there is provied a hole to accept one end of the inwardly extending portion 20, and screws 37 are used to hold the two portions together. Such a construction, or a modification thereof may also be used if it is desired to have the clamp bar assembly 16 be adjustable to accommodate different width tires. Again it is obvious that many such arrangements may be used with my invention, and all will be within the scope of the claims.

To prevent the chains 17 from tangling, the ends of the chain proximate the pivot points may be covered with a suitable sheathing or the like 41, and be separated by a suitable chain separation device 42.

Having now described the actual physical features of my construction, I now turn to a discussion of the factors concerning the forces acting on the various parts of my design which make it of a self engaging construction once the vehicle tire starts to rotate, much the same as a self energizing brake is aided in applying additional braking force because of the rotation of the brake drum.

Figure 7:
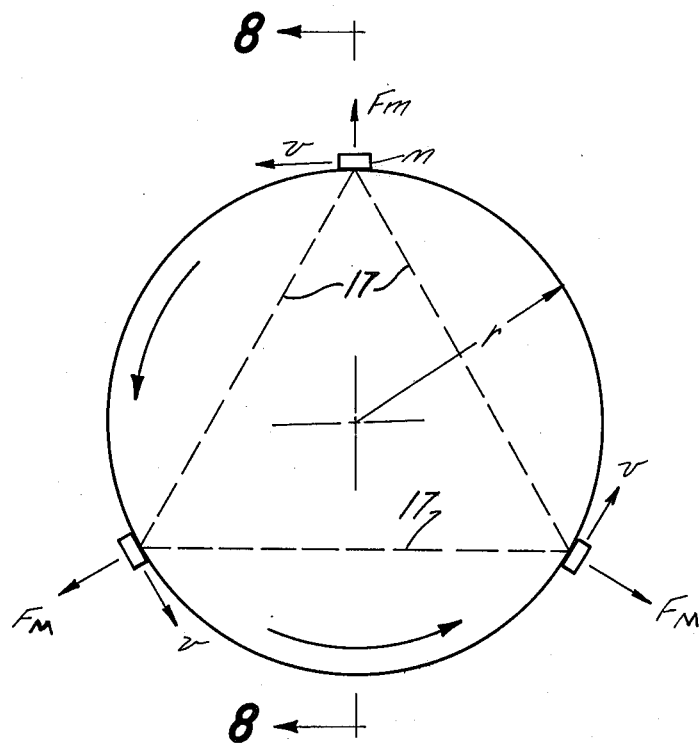
FIG. 7 is a schematic force diagram showing the centrifugal Force $F_m$ as produced at the center gravity of the clamp bar assemblies.
Figure 8:
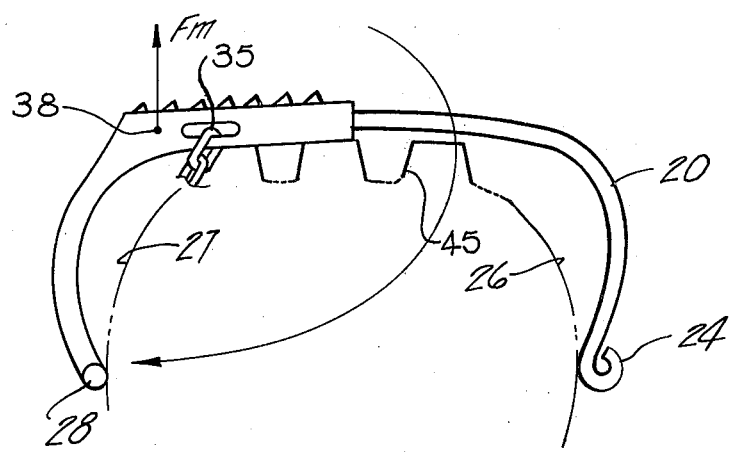
FIG. 8 is a sectional view of a vehicle tire showing the moment produced about the pivot point of a clamp bar assembly.
Figure 9:
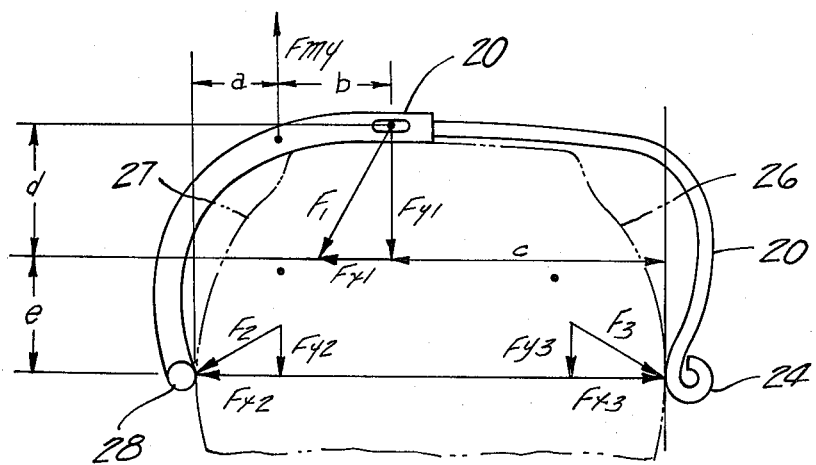
FIG. 9 is a free body diagram of the vertical and horizontal forces acting upon one clamp bar assembly.

Referring now to FIGS. 7-9, there is shown the vehicle tire 15 being rotated in a counterclockwise direction. This produces a tangential component of force illustrated by vector "v" and a normal component of force illustrated by the vector $F_m$ centrifugal vector force Fm with the symbol "m" representing the mass of the clamp bar assembly 16.

The magnitude of the centrifugal force $F_m$, which is directed away from the center of said tire 15, is $F_m = m v^2/r$, "m" being the mass of the clamp bar assembly 16, "v" is the velocity of the tire, while "r" is the radius of the tire 15.

For example, the magnitude of the centrifugal force Fm, at the vehicle speed of 60 mph, a clamp bar assembly 16 of 0.62 lbs. weight and a tire of 1.15 ft. radius would be:

$$Fm = \frac{m v^2}{r}$$

$$m = \frac{w}{g} = \frac{0.62 \text{ lb.}}{32 \text{ ft.} / (\text{sec})^2}$$

$$V = 88 \text{ ft/sec}$$

$$Fm = \frac{0.62}{32} \frac{(88)^2}{(1.15)} \frac{\text{lb. (Sec}^2) \text{ ft}^2}{\text{ft. (Sec}^2) \text{ ft}}$$

$$Fm = 130.47 \text{ lb.}$$

The moment produced by the centrifugal force $F_m$ acting about the pivot point 35 with the forces directed through the center of gravity 38 of the clamp bar assembly 16 is shown in a greatly simplified form in FIG. 8. From this figure it is obvious that what is desired is to produce a clockwise moment about the pivot point 35 so that the plurality of clamp bar assemblies 16 taken together with the connecting means such as the chain 17 tends to wrap itself around the rotating tire.

To show in more detail the factors which must be considered in the design of my invention, I show in FIG. 9 a detailed free body force diagram of the forces acting on one of the clamp bar assemblies. The centrifugal force Fm can be illustrated to be acting through the center of gravity 38 as shown in FIG. 8. This centrifugal force will be opposed by the forces $F_1$ exerted by the combined pull of the connecting chains on the pivot point 35, while because of the spring nature of the inwardly extending portion 20 of the clamp bar assembly 16 and the clockwise movement M produced by the Force F1 acting around the center of gravity 38 there will be forces exerted normal to the surface of the tire inner and outer side walls at the point of contact with the extremities 24 and 28 of the clamp bar assembly. These are represented by the force vectors $F_2$ and $F_3$. Thus the forces radiating outward from the center of the tire 15 can be summed as $F_m = F_{y1} - F_{y2} - F_{y3}$ and the forces transverse to the direction of the centrifugal force can be summed as $F_{x1} - F_{x2} + F_{x3} = 0$.

We may consider what magnitude of the centrifugal force Fm is necessary to produce a clockwise moment about the pivot point 35. The moment M will equal $F_m(b) + F_{y2}(a+b) - F_{y3}(c) - F_{x2}(d+e+f) + F_{x3}(-d+e+f)$. Since the axis force components X are of only small magnitude compared to the radial forces y and therefore contribute little to the production of the moment M, for purposes of illustration they may be eliminated and the equation simplifies to $M = F_m(b) + F_{y2}(a+b) - F_{y3}(c)$.

Obviously to have a clockwise moment about the pivot point 35 the moment produced by the centrifugal force Fm must be greater than the sum of the moments produced by the y components of forces F2 and F3, therefore, the moment Fm (b) must be greater than $F_{y3}(c) - F_{y2}(a+b)$.

If the center of gravity were at the pivot point 35 you would have a zero moment, as the quantities $F_{y2}(a+b)$ and $F_{y3}(c)$ would be equal.

Thus, it is obvious that to have a clockwise moment, such as shown in FIGS. 8 and 9, the center of gravity 38 on each clamp bar assembly 16 must be located on the outwardly extending portion 25 of the clamp bar assembly 16, and for this to occur the outwardly extending portion 25 must be heavier than the inwardly extending portion and of such configuration so that there is a clockwise positive moment produced by the centrifugal vector Force Fm acting in a radial outward direction from the center of spinning tire 15, thus it can be seen that the greater the mass of the outwardly extending portion 25, the greater will be the distance between the center of gravity 38 and the pivot point 35 resulting in a higher positive moment which will keep my emergency traction device on the rotating tire 15 regardless of whether one of the clamp bar assemblies 16 is in contact with the ground at any given time since the centrifugal force Fm acting on the outwardly extending portion 25 of the clamp bar assembly 16 will cause a rotation of the clamp bar assembly 16 about its pivot point 35 which will be resisted by the tread 45 of said tire 15 as the straight portion 21 of the clamp bar assembly is forced downwardly in contact with said vehicle tire 15.

It is to be understood, therefore, that as mentioned above, any configuration of the clamp bar assembly 16 whether integral, or two piece, or more may be used, and the clamp bar assemblies 16 may be made of any suitable material, as long as a positive moment is produced about the pivot point 35. Thus, by abandoning the old approaches used in designing traction devices, and applying and taking advantage of the physical forces exerted on such traction devices in operation, I have provided a novel emergency traction device.

I claim:

1. An emergency traction device for use on tires and the like having inner and outer sidewalls and including at least three clamp bar assemblies interconnected by suitable connecting means of substantially equal length, wherein each of said clamp bar assemblies has an inwardly and an outwardly extending portion and a pivot point, with said suitable connecting means being connected to said clamp bar assemblies at said pivot point, said pivot point being located near the center of gravity of each of said clamp bar assemblies, on the outwardly extending portion thereof, between the center of gravity and the beginning of the inwardly extending portion of the clamp bar assembly, wherein said inwardly and said outwardly extending portion of the clamp bar assembly both having a straight portion substantially coextensive with the thread of said tire and a curvilinear portion extending radially inwardly of the tire and adapted to contact and exert a pressure on the respective side wall of said tire to grip it while at rest, said curvilinear portion of said outwardly extending portion of each clamp bar assembly being of such a degree of curvature that the center of gravity of the clamp bar assembly will substantially act normally to the tire tread, with said inwardly extending portions of each clamp bar assembly thus being of a configuration such that the mass of the outwardly extending portion of each clamp bar assembly shall be substantially greater than that of the inwardly extending portion of the clamp bar assembly so that the resultant centrifugal force produced during the tire rotation and acting through the center of gravity of the clamp bar assembly located on said outwardly extending portion thereof will produce a moment about said pivot point which causes the inwardly extending straight portion to contact and exert a pressure against the tread of said tire when said tire is in a rotating motion.

2. The device defined in claim 1, wherein the extremities of said inwardly and said outwardly extending portions contact said inner and outer side walls of said tire on the curvature of the sidewalls more than midway between the tread and the rim.

3. The device in claim 2, with said extremity of said outwardly extending portion being formed from a bar of a solid material of circular cross-section and about an inch long and being suitably attached to said portion transversely to the plane of the clamp bar assembly and wherein said extremity of the inwardly extending portion is curved back away from the tire in some manner.

4. The device defined in claim 2, and including at least one gripper chain attached to each side of said straight portion of said outwardly extending portion.

5. The device defined in claim 4, wherein said suitable connecting means include adjusting means interposed between the ends of each one of said means.

6. The device defined in claim 1, wherein said suitable connecting means include adjusting means interposed between the ends of at least one of said means.

7. The device defined in claim 2, wherein said straight portion of said outwardly extending portion of said clamp bar assembly has gripping teeth integrally formed on the outer surface of the straight portion thereof.

8. The device claimed in claim 2, wherein each of said clamp bar assemblies is of integral one-piece construction, and made of a spring like material.

9. The device claimed in claim 5, wherein each of said clamp bar assemblies is of integral one-piece construction, and made of a spring like material.

10. The device defined in claim 1, wherein each of said clamp bar assemblies is of a two-piece construction.

11. The device defined in claim 7, wherein said each of said clamp bar assemblies is of a two-piece construction.

12. The device defined in claim 10, wherein said outwardly extending portion of said clamp bar device is of a rigid construction and said inwardly extending portion of said clamp bar assembly is of a spring like material, with said inwardly extending portion and said outwardly extending portion being fastened together by suitable fastening means.

13. The device defined in claim 11, wherein said outwardly extending portion of said clamp bar device is of a rigid construction and said inwardly extending portion of said clamp bar assembly is of a spring like material, with said inwardly extending portion and said outwardly extending portion being fastened together by suitable fastening means.

14. The device defined in claim 13, wherein said suitable fastening means consists of a weld between said outwardly and said inwardly extending portions of said clamp bar assembly.

15. The device defined in claim 13, wherein said suitable fastening means consists of a connection made with at least one nut and bolt assembly between said outwardly and said inwardly extending portions of said clamp bar assembly.

16. The device defined in claim 14, wherein said suitable connecting means attached to said pivot points are kept from tangling by a suitable chain separation device.

17. The device defined in claim 16, wherein said suitable connecting means are partially covered by a suitable sheath to further prevent tangling.

18. The device defined in claim 17, wherein said suitable connecting means are in the form of chains.

* * * * *